US011079716B2

(12) United States Patent
Abe

(10) Patent No.: US 11,079,716 B2
(45) Date of Patent: Aug. 3, 2021

(54) IMAGE FORMING APPARATUS

(71) Applicant: BROTHER KOGYO KABUSHIKI KAISHA, Nagoya (JP)

(72) Inventor: Koji Abe, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/360,393

(22) Filed: Mar. 21, 2019

(65) Prior Publication Data

US 2019/0302685 A1 Oct. 3, 2019

(30) Foreign Application Priority Data

Mar. 29, 2018 (JP) ............................ JP2018-063859

(51) Int. Cl.

| | |
|---|---|
| ***G03G 21/18*** | (2006.01) |
| ***G03B 21/16*** | (2006.01) |
| ***G03G 21/16*** | (2006.01) |
| ***G03G 15/08*** | (2006.01) |

(52) U.S. Cl.

CPC ....... *G03G 21/1825* (2013.01); *G03G 15/087* (2013.01); *G03G 21/1633* (2013.01); *G03G 21/1647* (2013.01); *G03G 2221/1654* (2013.01); *G03G 2221/1853* (2013.01)

(58) Field of Classification Search

CPC ........... G03G 21/1817; G03G 21/1825; G03G 21/1633; G03G 2221/1654

See application file for complete search history.

(56) References Cited

U.S. PATENT DOCUMENTS

| | | | | |
|---|---|---|---|---|
| 7,260,342 | B2 * | 8/2007 | Nishimura | G03G 15/0813 399/111 |
| 9,471,035 | B2 * | 10/2016 | Sato | G03G 21/1633 |
| 2006/0029418 | A1 | 2/2006 | Ishii et al. | |
| 2006/0029419 | A1 | 2/2006 | Shiraki | |
| 2006/0029420 | A1 | 2/2006 | Ishii et al. | |
| 2006/0029421 | A1 | 2/2006 | Ishii et al. | |
| 2006/0029422 | A1 | 2/2006 | Shiraki | |
| 2006/0029423 | A1 | 2/2006 | Shiraki | |
| 2006/0133850 | A1 | 6/2006 | Nishimura | |
| 2015/0023692 | A1 * | 1/2015 | Tanaka | G03G 21/1846 399/113 |
| 2016/0041519 | A1 | 2/2016 | Sato | |

FOREIGN PATENT DOCUMENTS

| | | |
|---|---|---|
| JP | 2006-106020 A | 4/2006 |
| JP | 2006-184502 A | 7/2006 |
| JP | 2016-038512 A | 3/2016 |

* cited by examiner

*Primary Examiner* — Ericka J Villaluna
(74) *Attorney, Agent, or Firm* — Merchant & Gould P.C.

(57) ABSTRACT

An image forming apparatus includes: a housing; a cover; a developing cartridge; and a drum cartridge including a drum frame, a photosensitive drum, a pressing member configured to press the developing roller to the photosensitive drum in a state where the developing cartridge is mounted to the drum frame, and a lock lever, the drum cartridge being mountable to an inside of the housing in a state where the developing cartridge is mounted to the drum cartridge, wherein in a state where the cover moves from the closed position to the opened position, the lock lever moves from a locked position at which the developing cartridge is prevented from being demounted from the drum frame to a non-locked position at which the developing cartridge is allowed to be demountable from the drum frame.

11 Claims, 15 Drawing Sheets

IMAGE FORMING APPARATUS

CROSS-REFERENCE TO RELATED APPLICATION

This application claims priorities from Japanese Patent Application No. 2018-063859 filed on Mar. 29, 2018, the entire subject matters of which is incorporated herein by reference.

TECHNICAL FIELD

The present disclosure relates to an image forming apparatus including a process cartridge in which a developing cartridge is mountable and demountable to and from a drum cartridge.

BACKGROUND

In the related art, an image forming apparatus having a process cartridge detachably mounted has been known in which a developing cartridge is mountable and demountable to and from a drum cartridge and only the developing cartridge can be replaced. When replacing only the developing cartridge, the process cartridge is demounted from the image forming apparatus and a lock release operation is then performed to demount the developing cartridge from the drum cartridge.

However, even when a user intends to replace only the developing cartridge, the user should demount the entire drum cartridge having the developing cartridge mounted thereto from the image forming apparatus.

SUMMARY

The present disclosure has been made in view of the above circumstances, and one of objects of the present disclosure is to provide an image forming apparatus from which the developing cartridge and the drum cartridge can be easily replaced.

According to an illustrative embodiment of the present disclosure, there is provided an image forming apparatus including: a housing having an opening; a cover configured to cover the opening and being movable between a closed position at which the cover covers the opening and an opened position at which the opening is opened; a developing cartridge including a developing roller and a developing frame having a toner accommodation chamber configured to accommodate therein toner; and a drum cartridge including a drum frame, to which the developing cartridge is detachably mountable, a photosensitive drum, a pressing member configured to press the developing roller to the photosensitive drum in a state where the developing cartridge is mounted to the drum frame, and a lock lever configured to lock the developing cartridge to the drum frame and releasing the lock based on a manual operation, the drum cartridge being mountable to an inside of the housing in a state where the developing cartridge is mounted to the drum cartridge. In a state where the cover moves from the closed position to the opened position, the lock lever moves from a locked position at which the developing cartridge is prevented from being demounted from the drum frame to a non-locked position at which the developing cartridge is allowed to be demountable from the drum frame.

DETAILED DESCRIPTION

Hereinafter, a first illustrative embodiment of the present disclosure will be described in detail with reference to the drawings. In the following descriptions, an overall configuration of a laser printer 1, which is an example of the image forming apparatus, is first described in brief and features of the present disclosure are then described in detail. Also, in the below descriptions, a direction in which a rotary shaft of a developing roller 64 extends is referred to as an axial direction.

Figure 1:
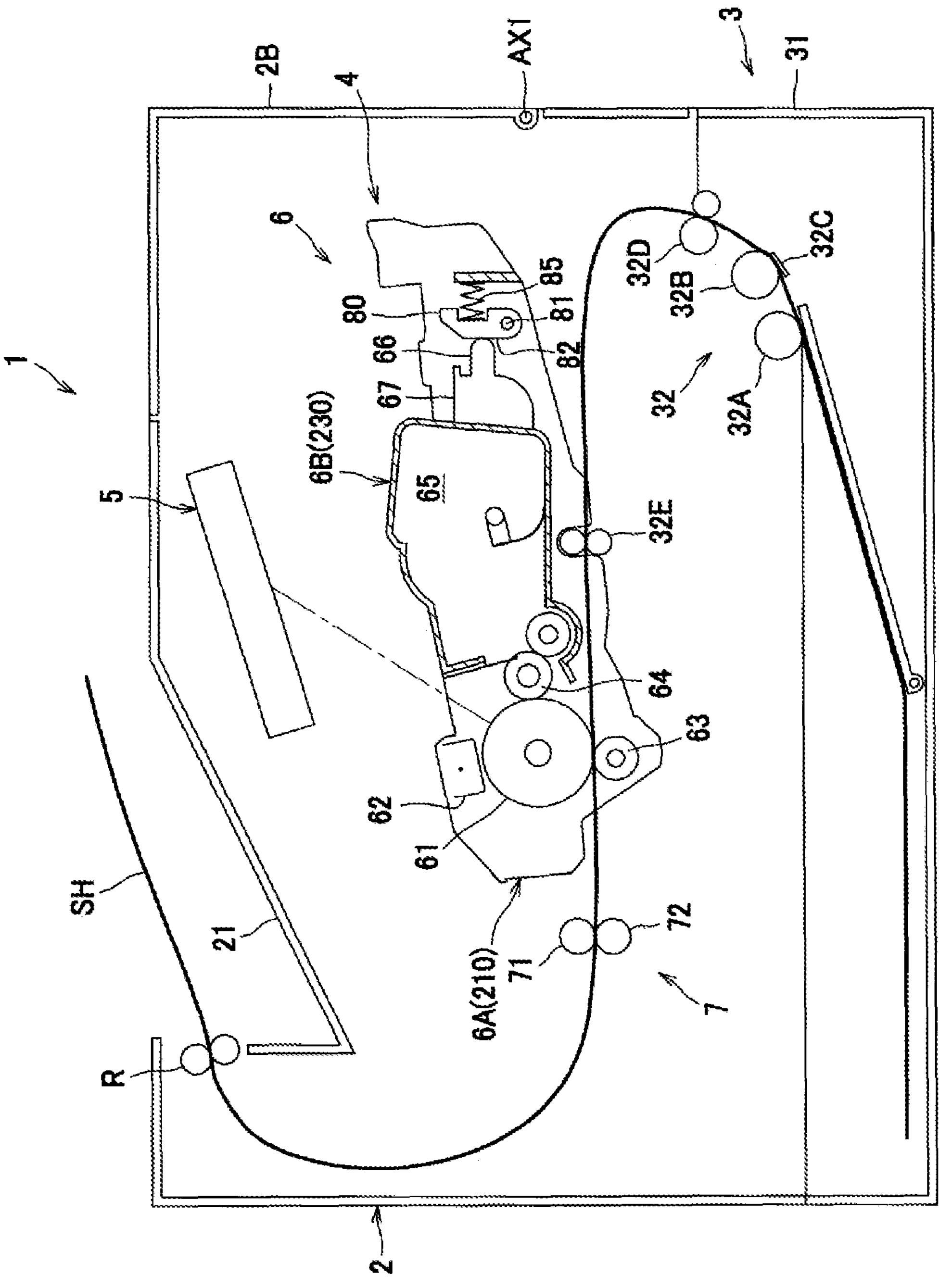
FIG. 1 illustrates a schematic configuration of a laser printer, which is an example of the image forming apparatus.

As shown in FIG. 1, the laser printer 1 includes a housing 2, a feeder unit 3, and an image forming unit 4. The feeder unit 3 is configured to feed a sheet SH. The image forming unit is configured to form an image on the sheet SH.

Figure 6:
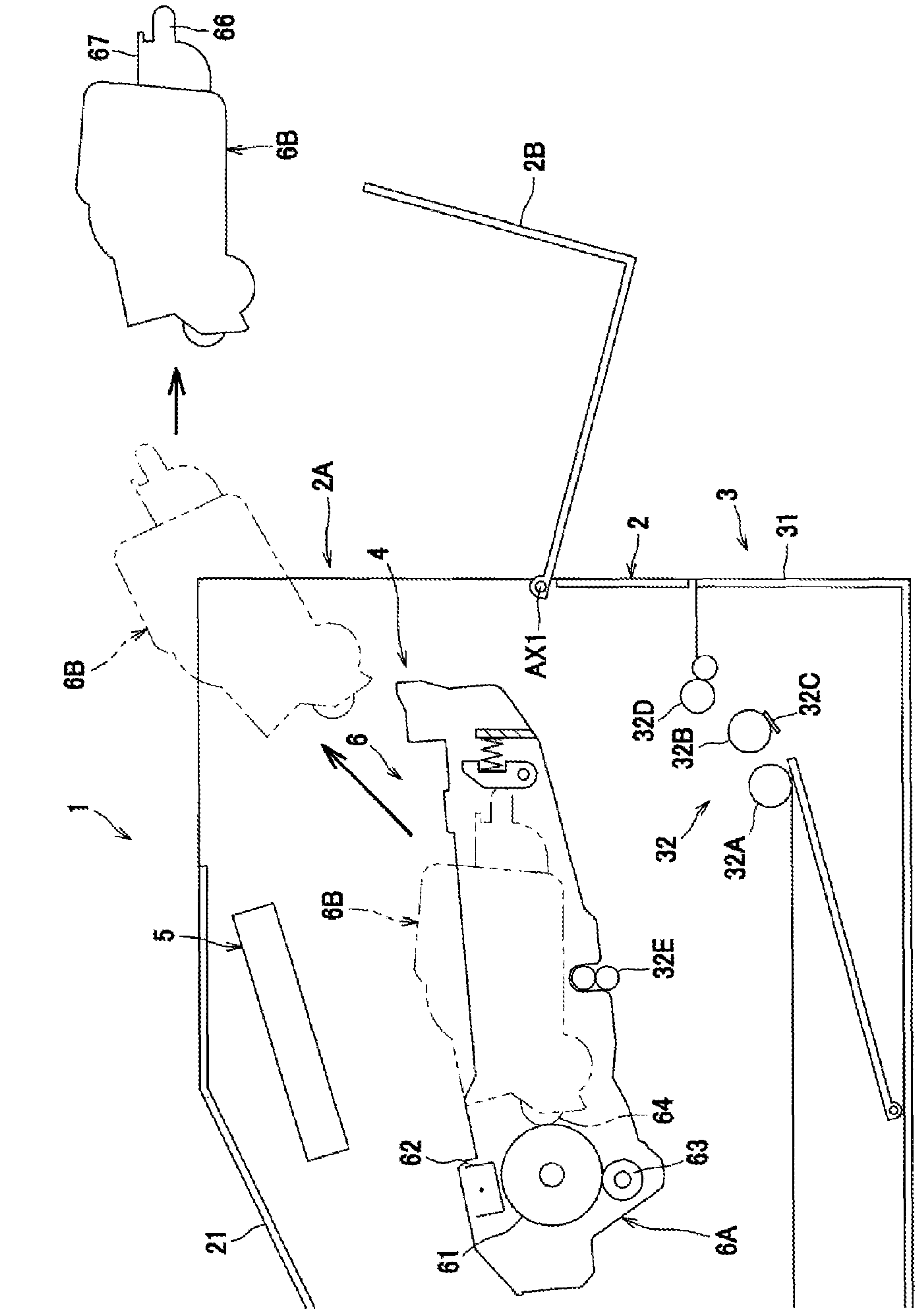
FIG. 6 illustrates a demounting operation of a developing cartridge.

As shown in FIG. 6, the housing 2 has an opening 2A at a front upper part, and the opening 2A is covered by a cover 2B. The cover 2B is movable between a closed position at which the opening 2A is covered, as shown in FIG. 1, and an opened position at which the opening 2A is opened, as shown in FIG. 6. That is, the cover 2B can open the opening 2A by swinging about a first swinging axis AX1.

The feeder unit 3 includes a feeder tray 31 and a feeder mechanism 32. The feeder mechanism 32 is configured to feed the sheet SH in the feeder tray 31 toward the image forming unit 4. The feeder mechanism 32 includes a feeder roller 32A, a separation roller 32B, a separation pad 32C, paper dust removing rollers 32D, and register rollers 32E. The register rollers 32E are rollers for aligning a leading end position of the sheet SH and are configured to appropriately switch stop and rotation thereof.

The image forming unit 4 includes a scanner unit 5, a process cartridge 6, a fixing device 7, and the like.

The scanner unit 5 includes a laser light-emitting unit, a polygon mirror, a lens, a reflector and the like, which are not shown. The scanner unit 5 is configured to scan a laser beam at high speed on a surface of a photosensitive drum 61, as shown with the dot-dash line.

The process cartridge 6 includes a drum cartridge 6A and a developing cartridge 6B.

Figure 2:
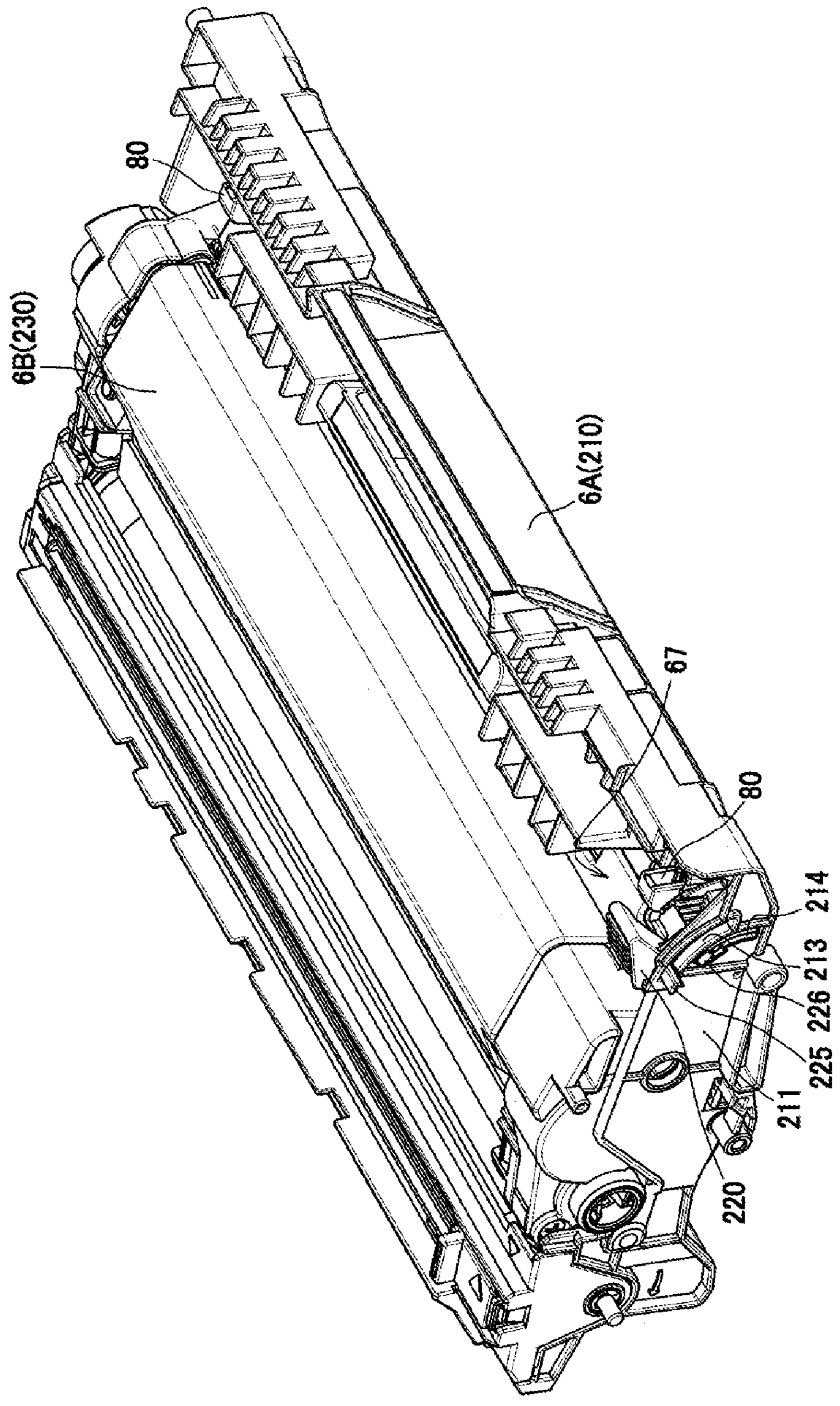
FIG. 2 is a perspective view of a process cartridge.

The drum cartridge 6A includes a drum frame 210, a photosensitive drum 61, a charger 62, a transfer roller 63, pressing members 80, and a lock lever 220 (refer to FIG. 2). The drum frame 210 is configured to rotatably support the photosensitive drum 61. The developing cartridge 6B can be detachably mounted to the drum frame 210.

As shown in FIG. 2, the pressing members 80 are respectively provided at both ends of the drum frame 210 in the axial direction. The lock lever 220 is provided at one end of the drum frame 210 in the axial direction. More specifically, the lock lever 220 is arranged outside the pressing member 80. The lock lever 220 is configured to be swingable about a swinging shaft (a second swinging axis AX2: refer to FIGS. 3 and 4B) with respect to the drum frame 210.

The pressing member 80 is supported to the drum frame 210 to be swingable about a swinging shaft 81. The pressing member 80 has a pressing surface 82. The drum cartridge 6A further includes an urging member. The urging member is a spring 85, for example. The spring 85 is arranged between the pressing member 80 and the drum frame 210, and urges the pressing member 80 toward the photosensitive drum 61.

Figure 4A:
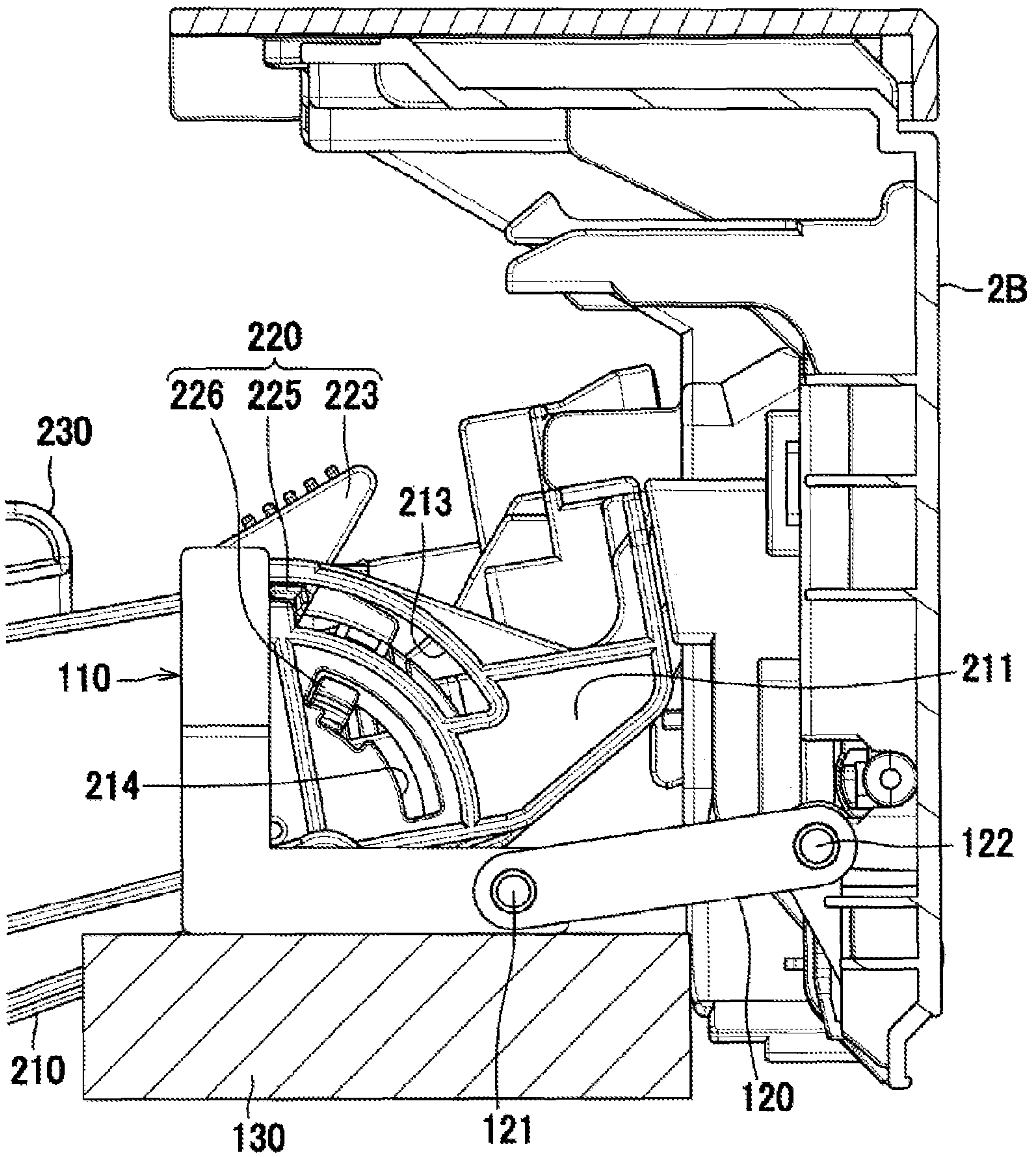
FIG. 4A is sectional view illustrating arrangement of an arm in a state where a cover is located at a closed position and the lock lever is located at a locked position.

As shown in FIGS. 2 and 4A, a sidewall 211 of the drum frame 210 has a first opening 213 and a second opening 214 at a front part. The first opening 213 and the second opening 214 extend in the swinging direction of the lock lever 220, respectively.

As shown in FIG. 1, the developing cartridge 6B includes a developing frame 230 and a developing roller 64. The developing frame 230 includes a toner accommodation chamber 65 configured to accommodate therein toner.

Also, the developing frame 230 has a protrusion 66, which is an example of the press receiving part to be pressed to the pressing member 80. The protrusion 66 is positioned at an end portion (end portion 67) opposite to a position, at which the developing roller 64 is mounted, with the toner accommodation chamber 65 being interposed therebetween.

In a state where the developing cartridge 6B is mounted to the drum frame 210, the pressing surface 82 of the pressing member 80 presses the protrusion 66 of the developing cartridge 6B to press the developing roller 64 to the photosensitive drum 61. At this time, the developing cartridge 6B is locked to the drum frame 210 by the lock lever 220. The structure and lock and lock release operations of the lock lever 220 will be described later.

When the cover 2B of the housing 2 is appropriately opened, the process cartridge 6 can be mounted into the housing 2 through the opening 2A, in a state where the developing cartridge 6B is mounted to the drum cartridge 6A. In the meantime, the developing cartridge 6B can be mounted and demounted to and from the drum frame 210. Therefore, the developing cartridge 6B can be taken out from the inside of the housing 2, in a state where the drum cartridge 6A is mounted in the housing 2.

In the process cartridge 6, a surface of the photosensitive drum 61 is uniformly charged by the charger 62. The scanner unit 5 emits the laser beam to the surface of the photosensitive drum 61 to expose the surface of the photosensitive drum 61, thereby forming an electrostatic latent image based on image data on the surface of the photosensitive drum 61.

Then, the developing roller 64 supplies the toner in the toner accommodation chamber 65 to the electrostatic latent image on the photosensitive drum 61, thereby forming a toner image on the surface of the photosensitive drum 61. Thereafter, while the sheet SH is conveyed between the photosensitive drum 61 and the transfer roller 63, the toner image carried on the surface of the photosensitive drum 61 is attracted to the transfer roller 63 and is transferred to the sheet SH.

The fixing device 7 includes a heating roller 71 and a pressing roller 72. In the fixing device 7, the toner transferred to the sheet SH is heat-fixed while the sheet SH passes between the heating roller 71 and the pressing roller 72.

The sheet SH discharged from the fixing device 7 is conveyed by sheet discharge rollers R and is then discharged from the sheet discharge rollers R onto a sheet discharge tray 21.

Figure 3:
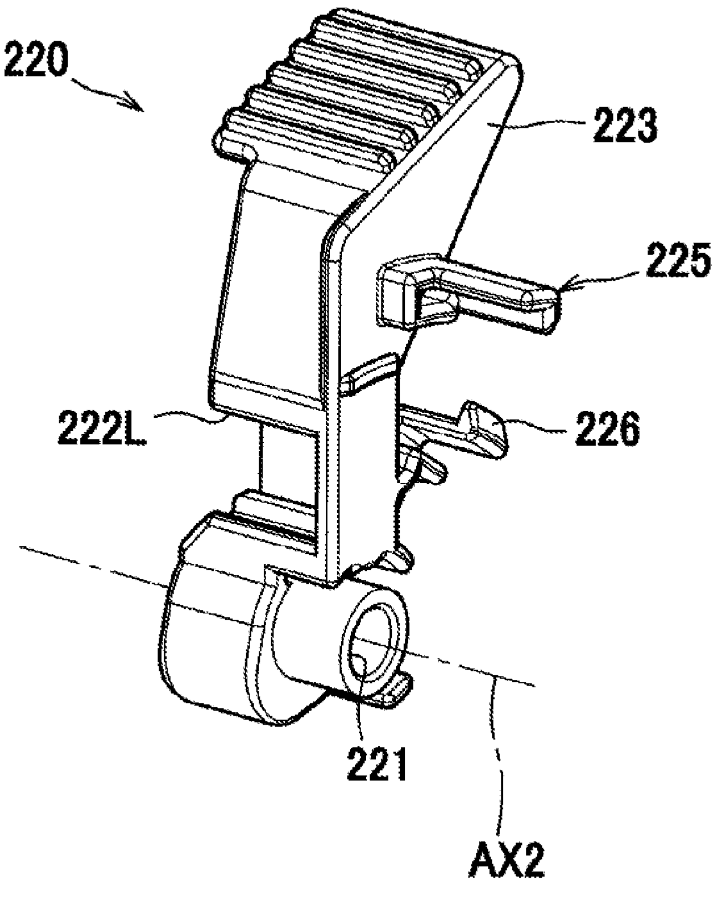
FIG. 3 is a perspective view of a lock lever in accordance with a first illustrative embodiment.

The configuration and operational aspects of the lock lever 220 are described. The lock lever 220 is a component for locking the developing cartridge 6B to the drum frame 210. FIG. 3 illustrates a posture of the lock lever 220 located at a locked position (refer to FIGS. 4A and 4B).

As shown in FIG. 3, the lock lever 220 has a shaft part 221 to be supported to the drum frame 210 and an operation part 223 that the user can operate with a finger. Also, the lock lever 220 has a first protrusion 225 and a second protrusion 226. The first protrusion 225 extends in the axial direction. The second protrusion 226 extends in the axial direction.

The lock lever 220 has a concave portion 222L. The concave portion 222L is located between the shaft part 221 and the operation part 223. The concave portion 222L can engage with a convex portion 231 (refer to FIG. 4B) of the developing frame 230, which will be described later.

The shaft part 221 has a cylindrical shape extending in the axial direction. The shaft part 221 is inserted into a circular cylinder part of the drum frame 210, so that the lock lever 229 can swing about a second swinging axis AX2.

As shown in FIG. 2, when the user pushes forward the operation part 223 with a finger in a state where the developing cartridge 6B is mounted to the drum frame 210 of the drum cartridge 6A, the lock is released.

As shown in FIGS. 2 and 4A, the first protrusion 225 is inserted in the first opening 213 of the drum frame 210. Also, the second protrusion 226 is inserted in the second opening 214 of the drum frame 210. As shown in FIG. 2, the first protrusion 225 protrudes outward from the sidewall 211 of the drum frame 210 in the axial direction (the axial direction parallel with the direction of the second swinging axis AX2 shown in FIG. 4B).

The lock lever 220 is movable between a locked position and a non-locked position. The non-locked position is a position (refer to FIG. 5B) rotated in a clockwise direction from the locked position shown in FIG. 4B. When the lock lever 220 is located at the locked position, it is not possible to demount the developing cartridge 6B from the drum frame 210. When the lock lever 220 is located at the non-locked position, it is possible to demount the developing cartridge 6B from the drum frame 210.

Figure 4B:
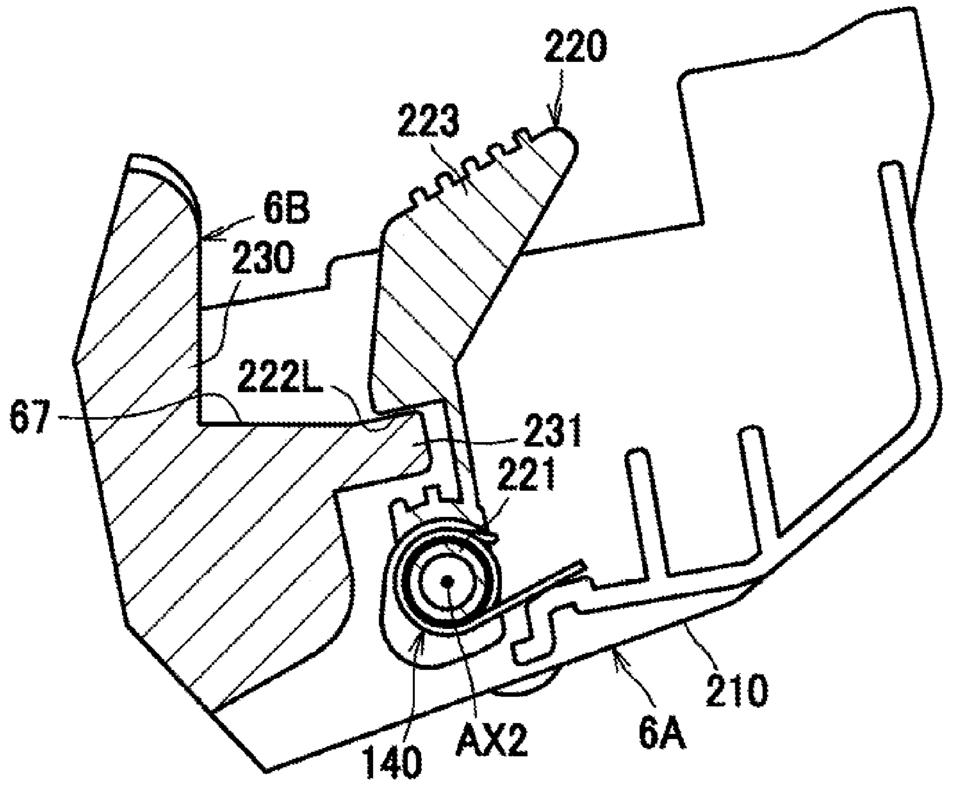
FIG. 4B is a sectional view illustrating an engagement state of the lock lever in a state where a cover is located at a closed position and the lock lever is located at a locked position.
Figure 5A:
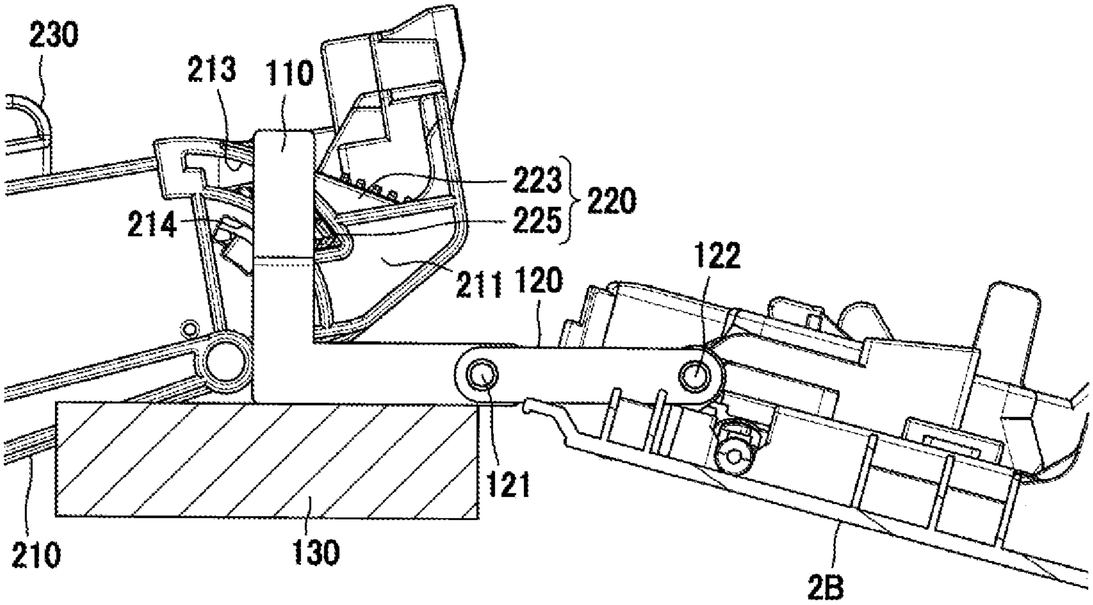
FIG. 5A is sectional view illustrating arrangement of the arm in a state where the cover is located at an opened position and the lock lever is located at a non-locked position.
Figure 5B:
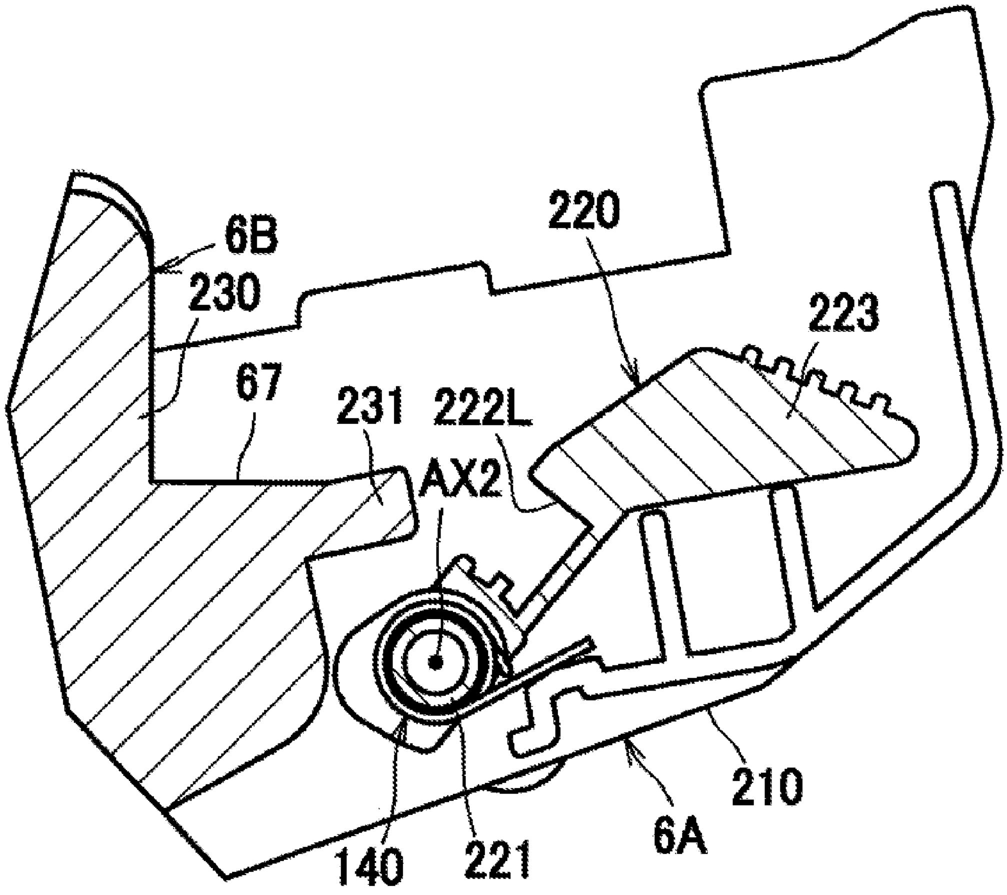
FIG. 5B is a sectional view illustrating a disengagement state of the lock lever in a state where the cover is located at an opened position and the lock lever is located at a non-locked position.

As shown in FIGS. 4B and 5B, a torsion spring 140, which is an example of the urging member, is mounted to an outer periphery of the cylindrical shaft part 221 of the lock lever 220. The torsion spring 140 is provided to urge the lock lever 220 toward the locked position.

The developing frame 230 of the developing cartridge 6B has a convex portion 231 provided at the end portion 67. The convex portion 231 protrudes outward (in other words, toward the opening 2A with being mounted to the housing 2 together with the drum cartridge 6A) from the developing frame 230.

When mounting the developing cartridge 6B to the drum frame 210, the developing roller 64 of the developing cartridge 6B is first made to face toward the photosensitive drum 61 and the developing cartridge 6B is mounted to the drum frame 210. Then, the protrusion 66 positioned at the end portion 67 of the developing cartridge 6B is slid to a rear surface (pressing surface 82) of the pressing member 80 against the urging force of the spring 85. At the same time, the convex portion 231 moves along the lock lever 220 against the urging force of the torsion spring 140 and the convex portion 231 is then fitted to the concave portion 222L. Thereby, the lock lever 220 swings and moves to the locked position.

When the lock lever 220 is located at the locked position, since the convex portion 231 of the developing frame 230 is fitted in the concave portion 222L of the lock lever 220, the movement of the developing cartridge 6B in a separation direction is restrained. As a result, the developing cartridge 6B is locked to the drum frame 210 and cannot be thus demounted.

Subsequently, an arm 110 configured to release the lock made by the lock lever 220 in conjunction with the movement of the cover 2B from the closed position to the opened position is described with reference to FIGS. 4A, 4B, 5A and 5B.

As shown in FIG. 4A, the arm 110 has a link 120. The link 120 is a component for coupling to the cover 2B.

The arm 110 is provided in the housing 2. Specifically, the arm 110 is arranged to face an outer side of the sidewall 211 of the drum frame 210. The arm 110 has an L shape.

The arm 110 is slidably engaged to a slide rail 130 of the housing 2. The slide rail 130 is provided in the housing. The slide rail 130 is an example of the slide guide configured to guide the sliding of the arm 110.

In the state where the developing cartridge 6B is mounted to the drum frame 210, when the developing cartridge 6B and the drum frame 210 are mounted in the housing 2, the first protrusion 225 is arranged between the arm 110 and the opening 2A (the cover 2B at the closed position). The first protrusion 225 is an example of the protrusion capable of engaging with the arm 110.

The arm 110 is coupled to the cover 2B via the link 120. Specifically, the link 120 is rotatably coupled to the arm 110 via a pin 121. The link 120 is rotatably coupled to the cover 2B via a pin 122.

When the cover 2B moves from the closed position shown in FIG. 4A to the opened position shown in FIG. 5A, the link 120 is correspondingly pulled and the arm 110 is thus slid along the slide rail 130. Thereby, the arm 110 engages with the first protrusion 225 of the lock lever 220 protruding from the sidewall 211, and pushes and moves (swings) the lock lever 220 from the locked position to the non-locked position.

When the cover 2B moves from the opened position shown in FIG. 5A to the closed position shown in FIG. 4A, the link 120 is pushed and the arm 110 is thus slid, so that the lock lever 220 is caused to swing in a counterclockwise direction from the non-locked position shown in FIG. 5B by the urging force of the torsion spring 140 and returns to the locked position shown in FIG. 4B.

FIG. 6 illustrates a process of moving the cover 2B to the opened position and taking out the developing cartridge 6B, in the laser printer 1 of the first illustrative embodiment. As shown in FIG. 6, in the state where the cover 2B moves to the opened position, the lock lever 220 is in the non-lock state shown in FIGS. 5A and 5B. Therefore, it is possible to demount the developing cartridge 6B from the drum cartridge 6A and to take out the same to an outside of the housing 2 through the opening 2A.

When mounting the developing cartridge 6B to the drum cartridge 6A in the housing 2, the user has only to push the same between the photosensitive drum 61 and the pressing member 80 in the drum frame 210. Thereby, the cover 2B is caused to swing from the opened position to the closed position, so that the arm 110 moves backward and the lock lever 220 returns to the locked position by the urging force of the torsion spring 140 (refer to FIGS. 4B and 5B).

Figure 7:
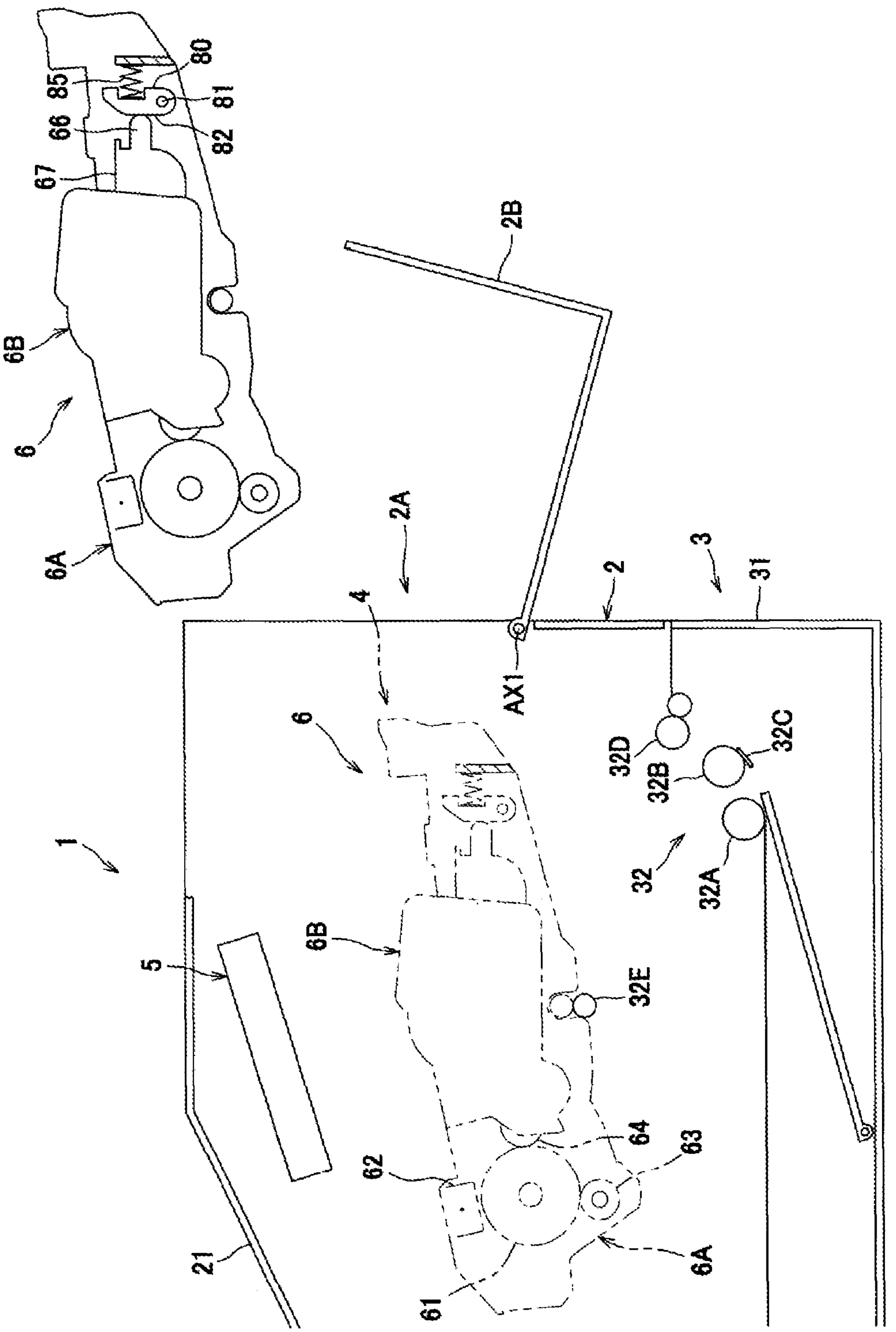
FIG. 7 illustrates a demounting/mounting operation of the process cartridge.

FIG. 7 illustrates a process of mounting or demounting the drum cartridge 6A having the developing cartridge 6B mounted thereto (i.e., the process cartridge 6) to or from the housing 2.

When the process cartridge 6 is located outside the housing 2, the lock lever 220 is located at the locked position shown in FIGS. 4A and 4B. When mounting the process cartridge 6, the first protrusion 225 is contacted to the arm 110 in the housing 2 while the process cartridge is pushed to a mounting position. As the process cartridge 6 moves to the mounting position, the cover 2B is located at the opened position and the arm 110 fixed at the position shown in FIG. 5A moves the first protrusion 225 relative to the second swinging axis AX2, thereby swinging the lock lever 220 from the locked position to the non-locked position (refer to FIG. 5B).

In a state (refer to the dashed-two dotted line in FIG. 7) where the cover 2B is located at the opened position and the process cartridge 6 is mounted, the lock lever 220 is located at the non-locked position shown in FIGS. 5A and 5B. Thereafter, the cover 2B is caused to swing from the opened position to the closed position, so that the arm 110 moves and the lock lever 220 returns to the locked position by the urging force of the torsion spring 140 (refer to FIGS. 4B and 5B).

When taking out the process cartridge 6 from the inside of the housing 2, the first protrusion 225 separates from the arm 110 in the housing 2 and the lock lever 220 returns to the locked position by the urging force of the torsion spring 140 while the process cartridge 6 is demounted from the state of FIG. 7 where the cover 2B has been moved from the closed position to the opened position.

The operations and effects of the laser printer 1 in accordance with the first illustrative embodiment configured as described above are described.

According to the first illustrative embodiment, when demounting the developing cartridge 6B from the drum frame 210 and taking out the same from the inside of the housing 2, the lock of the developing cartridge 6B is released simply by moving the cover 2B from the closed position to the opened position. Therefore, it is possible to take out the developing cartridge 6B from the inside of the housing 2 without performing a manual lock release operation of the lock lever 220 in the housing 2.

The arm 110 configured to engage with the lock lever 220 is used, so that it is possible to implement the lock release in conjunction with the movement of the cover 2B to the opened position without a separate mechanism such as an electric actuator. Also, the first protrusion 225 engages with the arm 110 with being arranged between the arm 110 and the opening 2A, so that the first protrusion does not interfere with the operation of taking out the developing cartridge 6B through the opening 2A.

Since the sliding of the arm 110 is guided by the slide rail 130 and the arm 110 is coupled to the cover 2B by the link 120, the swinging of the cover 2B is efficiently converted into the sliding of the arm 110 for lock release. Therefore, the smooth lock release operation is implemented.

Since the concave portion 222L of the lock lever 220 engages with the convex portion 231 protruding toward the opening 2A and the developing cartridge 6B is thus locked, a moving direction of the cover 2B to the opened position and a moving direction of the lock lever 220 to the non-locked position are the same. Therefore, it is possible to implement the smooth lock release operation with the simple configuration.

Since the drum cartridge 6A is provided with the torsion spring 140 for urging the lock lever 220 from the non-locked position toward the locked position, it is possible to return the lock lever 220 from the non-locked position to the locked position, in conjunction with the movement of the cover 2B to the closed position.

The lock lever 220 is configured to swing between the locked position and the non-locked position about the second swinging axis AX2. Thereby, it is possible to arrange the operation part 223 of the lock lever 222 at a position at which the user can easily operate the release operation at the locked position, and to retreat the operation part to a position at which it does not interfere with the user's operation of demounting the developing cartridge 6B at the non-locked position.

Although the first illustrative embodiment of the present disclosure has been described, the present disclosure is not limited to the illustrative embodiment. The specific configuration can be appropriately changed without departing from the gist of the present disclosure.

Figure 8:
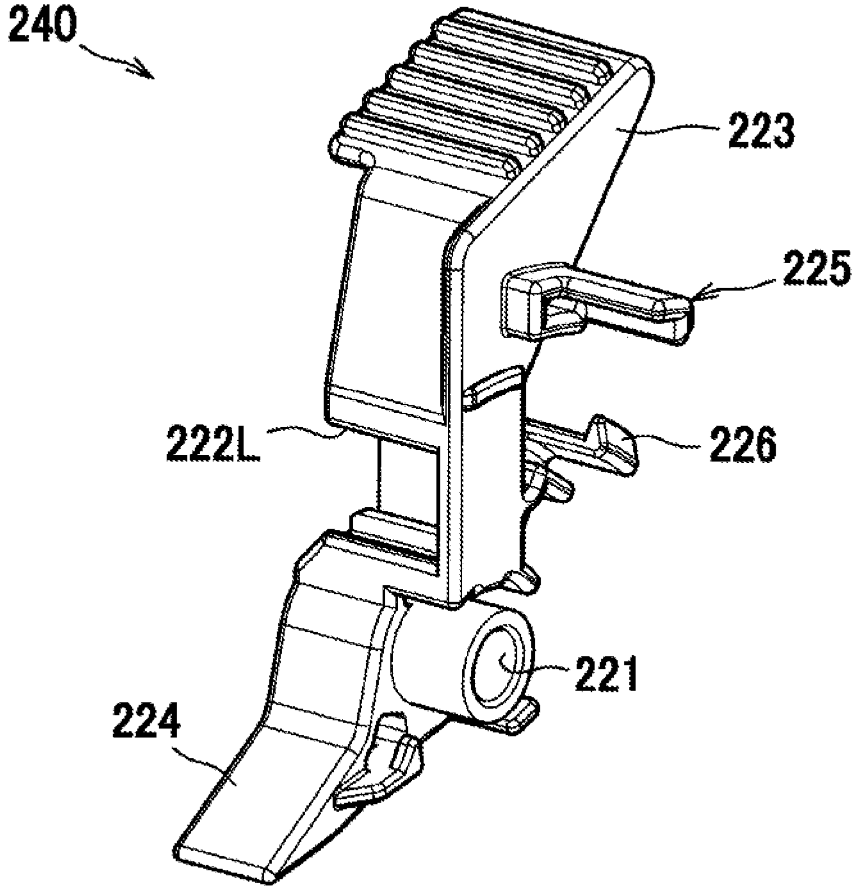
FIG. 8 is a perspective view of a lock lever in accordance with a second illustrative embodiment.

The lock lever is not limited to the configuration of the first illustrative embodiment. A configuration where a lock lever 240 shown in FIG. 8 is adopted is described as a second illustrative embodiment with reference to FIGS. 8 to 12. In below descriptions, the same configurations as the first illustrative embodiment are denoted with the same reference numerals, and the descriptions thereof are omitted.

Figure 9A:
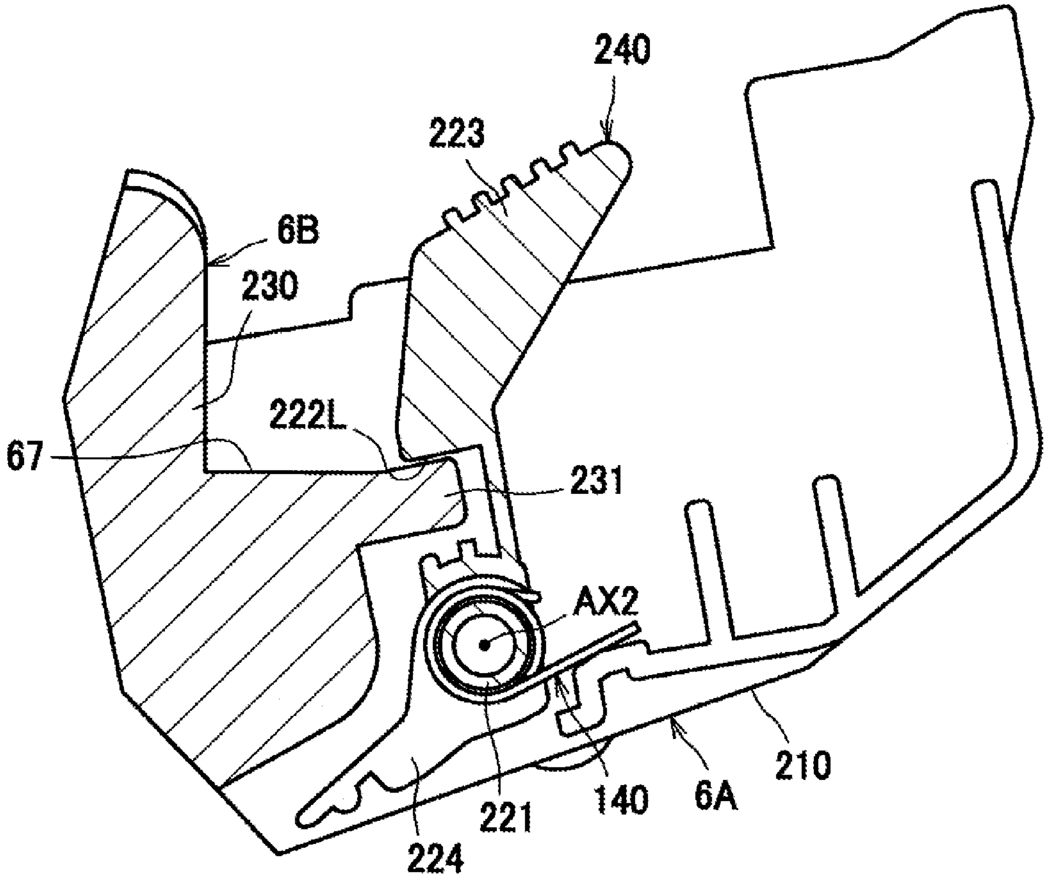
FIG. 9A illustrates an operation of the lock lever at the locked position.
Figure 9B:
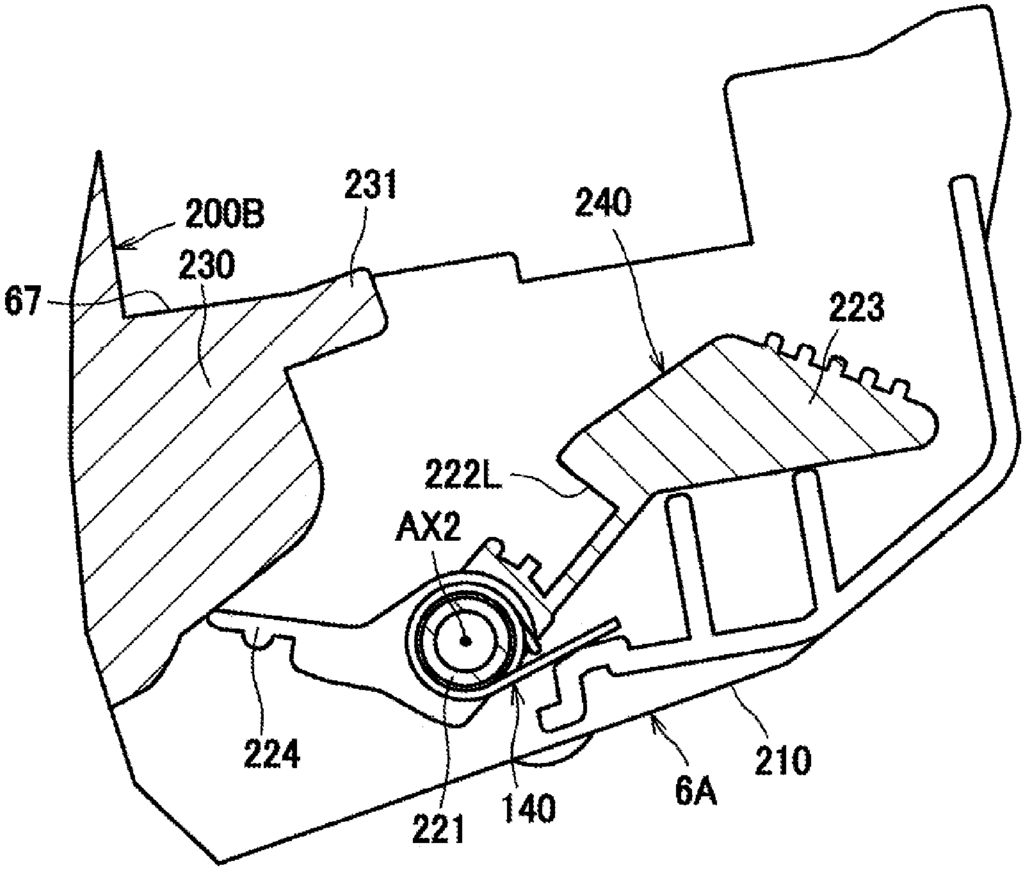
FIG. 9B illustrates an operation of the lock lever at the non-locked position.

As shown in FIG. 8, the lock lever 240 of the second illustrative embodiment has a push-up arm 224. As shown in FIG. 9A, when the lock lever 240 is located at the locked position, the concave portion 222L engages with the convex portion 231 of the developing frame 230. In this state, the developing cartridge 6B is locked to the drum frame 210 and cannot be thus demounted.

When the lock lever 240 is located at the locked position, the push-up arm 224 is not in contact with the developing frame 230. Then, when the lock lever 240 is caused to swing to the non-locked position shown in FIG. 9B by the user's operation, the concave portion 222L is spaced backward from the convex portion 231 and the push-up arm 224 pushes up the developing frame 230.

When the developing frame 230 is pushed up, the protrusion 66 is slid upward along the pressing surface 82. At this time, since the protrusion 66 is pressed to the pressing surface 82 by the urging force of the spring 85, when the protrusion separates from the pressing surface 82, it runs on the support surface 83 and is supported thereto (refer to FIG. 10). The support surface 83 functions as a sliding contact surface that, when mounting the developing cartridge 6B, sliding-contacts the protrusion 66 and guides the same to the pressing surface 82, too.

In the state where the process cartridge 6 is mounted in the housing 2 and the cover 2B is closed, the lock lever 240 is located at the locked position shown in FIG. 9A. When the cover 2B is caused to swing from this state toward the opened position, the method described with reference to FIGS. 4A and 5A is performed, like the first illustrative embodiment, so that the lock lever 240 moves to the non-locked position shown in FIG. 9B against the urging force of the torsion spring 140.

Figure 10:
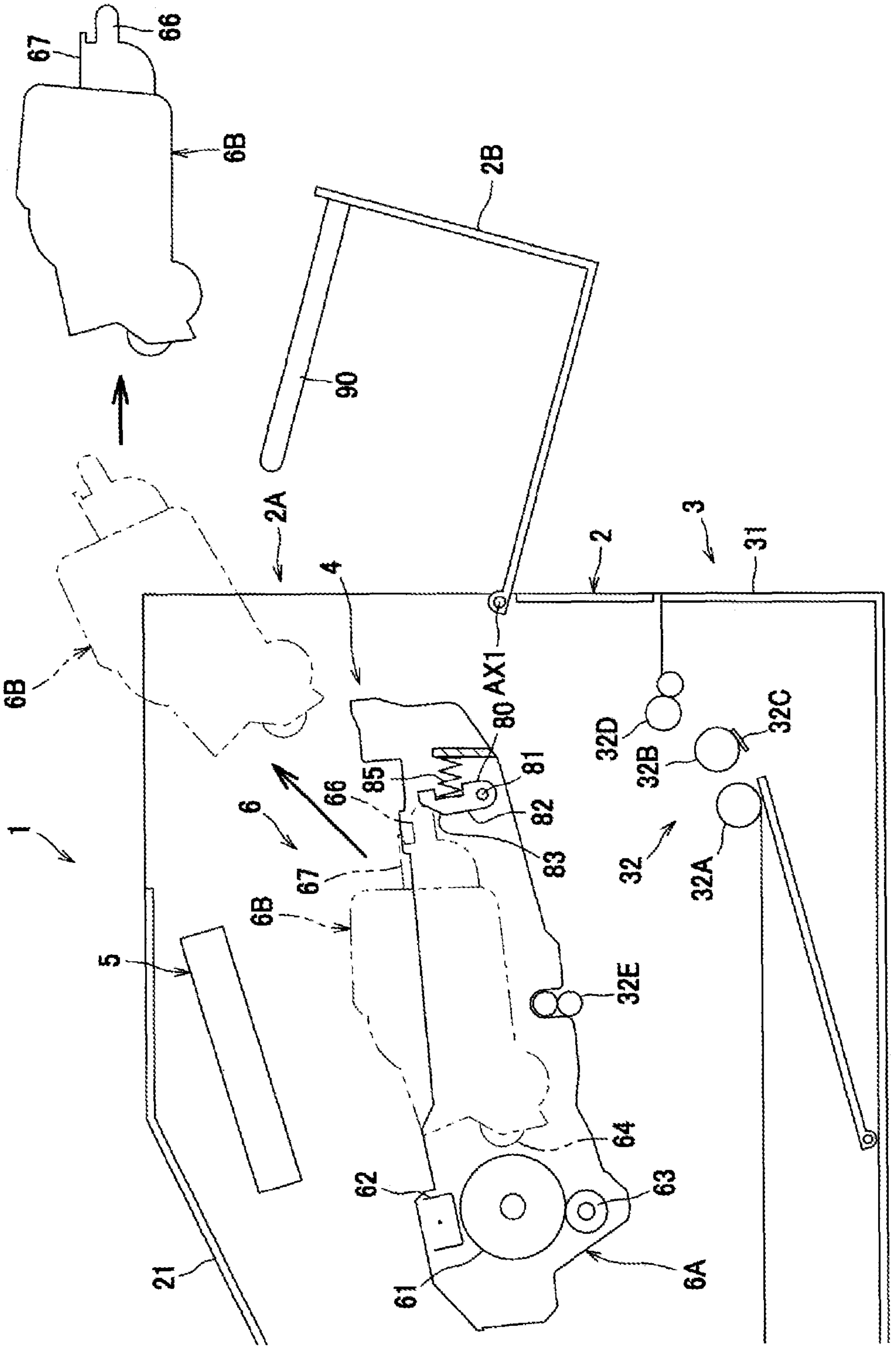
FIG. 10 illustrates the demounting operation of the developing cartridge.

FIG. 10 illustrates a process of moving the cover 2B to the opened position and taking out the developing cartridge 6B, in the laser printer 1 of the second illustrative embodiment. As shown with the dashed-two dotted line in FIG. 10, in the state where the cover 2B moves to the opened position, the lock lever 240 is located at the non-locked position shown in FIG. 9B. Then, the end portion 67 of the developing frame 230 is lifted by the push-up arm 224, and the support surface 83 of the pressing member 80 supports the protrusion 66 by the urging force of the spring 85, as described. Therefore, the end portion 67 of the developing cartridge 6B is kept as it is lifted. In this state, the user can demount the developing cartridge 6B from the drum cartridge 6A and take out the same to the outside of the housing 2 through the opening 2A.

As described in the above, according to the second illustrative embodiment, when the cover 2B is opened, the developing cartridge 6B is lifted from the drum frame 210. Therefore, it is possible to make the user recognize that the lock is released. Also, since the developing cartridge 6B is kept as it is lifted from the drum frame 210, the user can easily perform the demounting operation.

The developing cartridge 6B can be kept in a state where the press receiving part (the protrusion 66) of the developing frame 230 is not pressed by the pressing member 80 (the pressing surface 82), at a non-pressing position. Therefore, the pressing of the developing roller 64 to the photosensitive drum 61 is released, so that it is possible to more easily take out the developing cartridge 6B.

Figure 11:
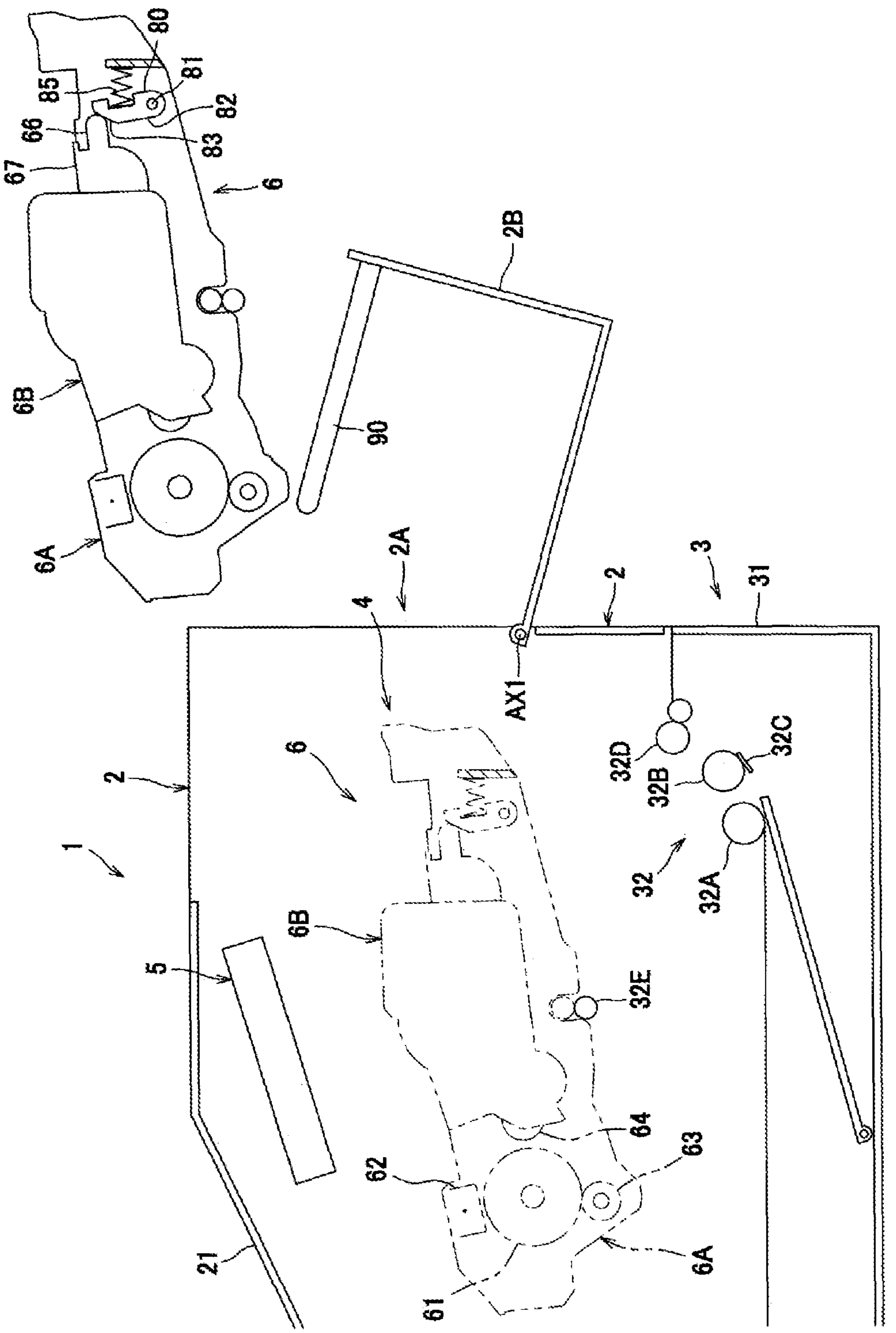
FIG. 11 illustrates the demounting/mounting operation of the process cartridge.

FIG. 11 illustrates a process of mounting or demounting the drum cartridge 6A having the developing cartridge 6B mounted thereto (i.e., the process cartridge 6) to or from the inside of the housing 2. Also in this case, when the cover 2B moves to the opened position, the lock lever 240 is located at the non-locked position shown in FIG. 9B and located at the non-pressing position at which the developing cartridge 6B is lifted.

Even when the drum cartridge 6A having the developing cartridge 6B mounted thereto (i.e., the process cartridge 6) is demounted from the housing 2, the developing cartridge 6B is kept in the state where the developing cartridge 6B is lifted by the pressing member 80 (i.e., located at the non-pressing position), as shown in FIG. 11. The user can lock the developing cartridge 6B to the drum frame 210 by pushing-in the developing cartridge 6B to a pressing position at which the protrusion 66 is pressed to the pressing surface 82 of the pressing member 80 and moving the lock lever 240 to the locked position shown in FIG. 9A.

Figure 12:
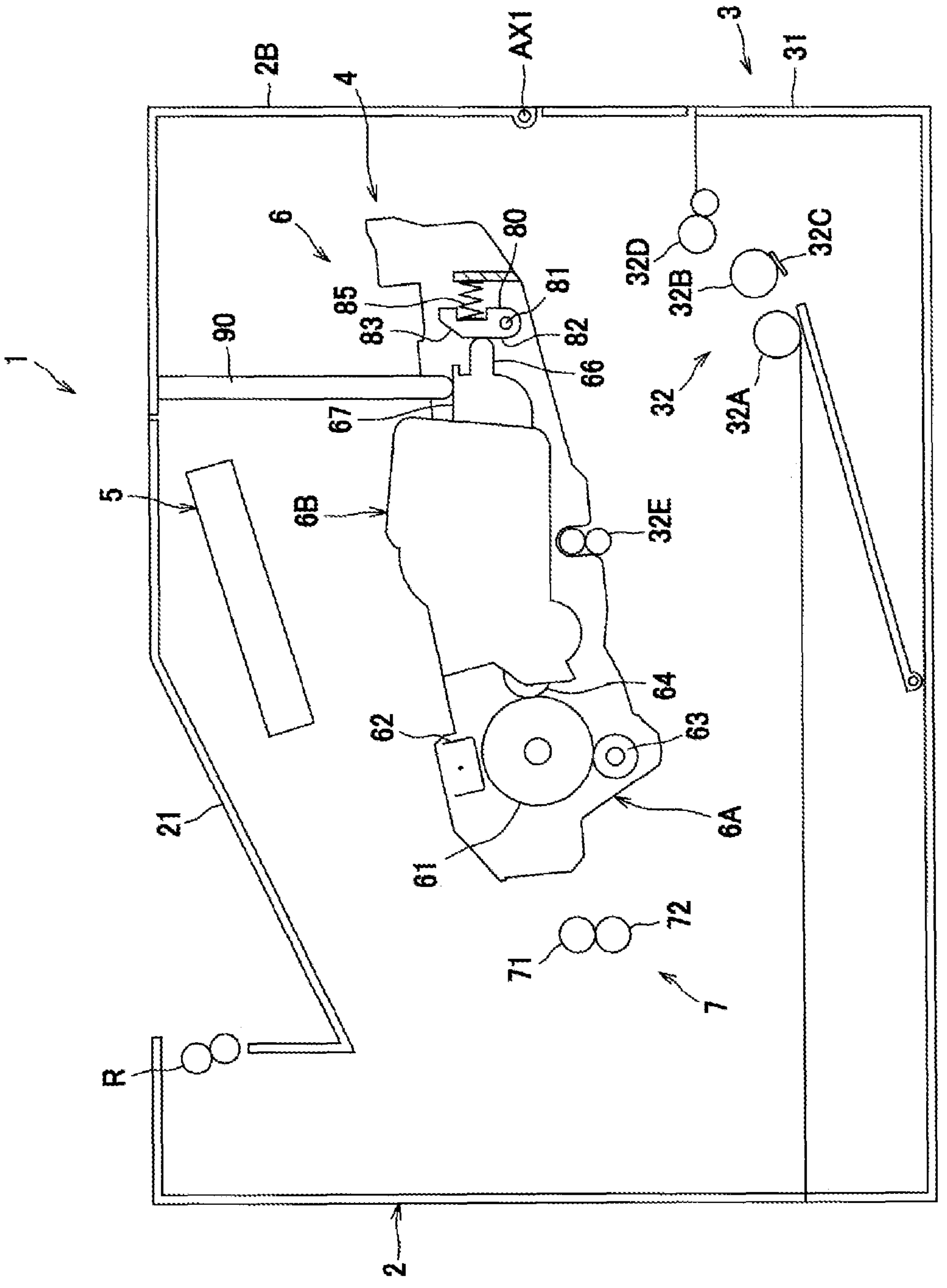
FIG. 12 illustrates a state of the process cartridge when the cover is in the closed state.

As shown in FIGS. 10 and 12, in the second illustrative embodiment, the cover 2B is provided with a contact protrusion 90. The contact protrusion 90 is a member extending from the cover 2B. The contact protrusion 90 is arranged at a position at which, when the cover 2B moves to the closed position, the contact protrusion 90 is contacted to the end portion 67 of the developing cartridge 6B and presses the developing cartridge 6B to the drum frame 210, as shown in FIG. 12.

In the second illustrative embodiment, when mounting the process cartridge 6 in a state where the developing cartridge 6B is mounted and is locked to the drum frame 210 by the lock lever 240, the first protrusion 225 is contacted to the arm 110 in the housing 2, so that the lock lever 240 is caused to swing from the locked position to the non-locked position. At this time, the end portion 67 of the developing cartridge 6B is once lifted relative to the drum frame 210.

Thereafter, when the cover 2B is caused to swing from the opened position to the closed position, the arm 110 moves, and the lock lever 240 also moves toward the locked position by the urging force of the torsion spring 140, and the contact protrusion 90 pushes down the end portion 67 against the urging force of the spring 85 to move the protrusion 66 to the position at which it is pressed to the pressing surface 82. Thereby, the convex portion 231 is fitted in the concave portion 222L, so that the developing cartridge 6B is locked to the drum frame 210. In this way, the developing cartridge 6B can be securely locked to the drum frame 210 simply by moving the cover 2B from the opened position to the closed position.

In the above illustrative embodiments, the cover is configured to cover the opening of the housing and to swing about the first swinging axis. However, the arrangement and shape of the opening and the swinging direction of the cover are not particularly limited. For example, a configuration where the cover swings upward or translates or slides with respect to the opening of the housing is also possible.

In the above illustrative embodiments, the arm has an L shape and is coupled to the cover via the link. However, the arm may have an arbitrary shape and may be directly coupled to the cover. Also, the shape and operation aspect of the lock lever are not limited to the shown illustrative embodiments and can be appropriately modified.

In the above illustrative embodiments, the torsion spring has been exemplified as the urging member for urging the lock lever from the non-locked position toward the locked position. However, as the urging member, the other elastic member such as a coil spring and a plate spring can also be used. Also, an elastic part integrated with the lock lever may be used as the urging member.

In the above illustrative embodiments, the image forming apparatus of the laser printer has been exemplified. However, the image forming apparatus may be configured to perform the exposure by an LED and may be a copier or a complex machine.

The respective elements of the illustrative embodiments and modified embodiments can be implemented with being arbitrarily combined.

According to the present disclosure, there is provided an image forming apparatus including: a housing having an opening; a cover configured to cover the opening and being movable between a closed position at which the cover covers the opening and an opened position at which the opening is opened; a developing cartridge including a developing roller and a developing frame having a toner accommodation chamber configured to accommodate therein toner; and a drum cartridge including a drum frame, to which the developing cartridge is detachably mountable, a photosensitive drum, a pressing member configured to press the developing roller to the photosensitive drum in a state where the developing cartridge is mounted to the drum frame, and a lock lever configured to lock the developing cartridge to the drum frame and releasing the lock based on a manual operation, the drum cartridge being mountable to an inside of the housing in a state where the developing cartridge is mounted to the drum cartridge. In a state where the cover moves from the closed position to the opened position, the lock lever moves from a locked position at which the developing cartridge is prevented from being demounted from the drum frame to a non-locked position at which the developing cartridge is allowed to be demountable from the drum frame.

According to the above configuration, since the lock of the developing cartridge is released simply by moving the cover from the closed position to the opened position, it is possible to demount the developing cartridge from the housing without performing a manual lock release operation of the lock lever in the housing.

The image forming apparatus may be configured as such that, wherein the cover opens the opening by swinging about a first swinging axis, wherein the developing cartridge further includes an arm arranged to be engageable with the lock lever, and wherein the arm is coupled to the cover and moves the lock lever from the locked position to the non-locked position in a state where the cover moves from the closed position to the opened position.

According to the above configuration, the arm capable of engaging with the lock lever is used, so that it is possible to implement the lock release in conjunction with the movement of the cover to the opened position without a separate mechanism such as an electric actuator.

The image forming apparatus may be configured as such that, the lock lever has a protrusion configured to engage with the arm, and the protrusion protrudes from the drum frame in an axial direction of the developing roller and is arranged between the arm and the opening.

The protrusion is provided to the lock lever, so that the lock lever does not interfere with the operation of taking out the developing cartridge through the opening of the housing.

The image forming apparatus may further include: a slide guide configured to guide sliding of the arm; and a link configured to couple the arm to the cover, wherein the link is rotatably coupled to the arm and the cover.

According to the above configuration, it is possible to implement the smooth lock release operation by efficiently converting the swinging of the cover into the sliding of the arm for lock release.

The image forming apparatus may be configured as such that, the developing cartridge has a convex portion protruding toward the opening in a state where the developing cartridge is mounted to the drum frame of the drum cartridge mounted to the inside of the housing, and the lock lever has a concave portion configured to engage with the convex portion.

According to the above configuration, since it is possible to implement the simple and reasonable design in which a moving direction of the cover to the opened position and a moving direction of the lock lever to the non-locked position are the same, it is possible to implement the smooth lock release operation with the simple configuration.

The image forming apparatus may be configured as such that, the lock lever is swingable about a second swinging axis between the locked position and the non-locked position, and lifts the developing cartridge from the drum frame when the lock lever swingably moves from the locked position to the non-locked position.

According to the above configuration, when the cover is opened, it is possible to make the user recognize that the lock is released. Also, since the lock lever is caused to swing, it is possible to arrange the operation part of the lock lever at a position at which the user can easily operate the release operation at the locked position, and to retreat the operation part to a position at which it does not interfere with the operation of demounting the developing cartridge at the non-locked position.

The image forming apparatus may be configured as such that, the developing frame has a press receiving part that is to be pressed by the pressing member, and the pressing member has a pressing surface, which presses the press receiving part when the pressing member is located at a pressing position at which the developing cartridge is mounted to the drum frame, and a support surface that, when the developing cartridge is lifted from the drum frame, supports the press receiving part and keeps the lifted developing cartridge at a non-pressing position.

According to the above configuration, the user can easily visually recognize that the lock has been released, and the user can easily handle the developing cartridge when demounting the same. Also, the developing cartridge can be kept in a state where the press receiving part of the developing frame is not pressed by the pressing member, at the non-pressing position. Therefore, the pressing of the developing roller to the photosensitive drum is released, and the developing cartridge can be more easily demounted.

In a form where the pressing member has a support surface that supports the press receiving part and keeps the developing cartridge at a non-pressing position, the image forming apparatus may further have a contact protrusion. The contact protrusion is coupled to the cover, is configured to contact the developing cartridge when the cover moves from the opened position to the closed position, and is movable the developing cartridge from the non-pressing position to the pressing position.

According to the above configuration, it is possible to securely lock the developing cartridge simply by moving the cover from the opened position to the closed position.

The image forming apparatus may be configured as such that, the drum cartridge includes an urging member configured to urge the lock lever from the non-locked position toward the locked position.

According to the above configuration, it is possible to return the lock lever from the non-locked position to the locked position with the simple configuration. In the meantime, the urging member may be provided integrally with the lock lever, or may be implemented by engaging an elastic member such as a separate spring from the lock lever with the lock lever.

According to the image forming apparatus, since the lock release operation of the lock lever, which can be manually operated, is performed in conjunction with the opening/closing operation of the cover, the operability is improved when the user replaces the developing cartridge. Since the operation is simple, it is possible to reduce an inadvertent error that the entire drum cartridge is replaced even when only the developing cartridge should be replaced.

What is claimed is:

1. An image forming apparatus comprising:

a housing having an opening;

a cover configured to cover the opening and being movable between a closed position at which the cover covers the opening and an opened position at which the opening is opened;

a developing cartridge including a developing roller and a developing frame having a toner accommodation chamber configured to accommodate therein toner; and a drum cartridge including a drum frame, to which the developing cartridge is detachably mountable, a photosensitive drum, a pressing member configured to press the developing roller to the photosensitive drum in a state where the developing cartridge is mounted to the drum frame, and a lock lever configured to lock the developing cartridge to the drum frame and releasing the lock based on a manual operation, the drum cartridge being mountable to an inside of the housing in a state where the developing cartridge is mounted to the drum cartridge, wherein in a state where the cover moves from the closed position to the opened position, the lock lever moves from a locked position at which the developing cartridge is prevented from being demounted from the drum frame to a non-locked position at which the developing cartridge is allowed to be demountable from the drum frame, and wherein the lock lever is swingable about a second swinging axis between the locked position and the non-locked position, and lifts the developing cartridge from the drum frame when the lock lever swingably moves from the locked position to the non-locked position.

2. The image forming apparatus according to claim 1 further comprising:

an arm arranged to be engageable with the lock lever;

wherein the cover opens the opening by swinging about a first swinging axis, and wherein the arm is coupled to the cover and moves the lock lever from the locked position to the non-locked position in a state where the cover moves from the closed position to the opened position.

3. The image forming apparatus according to claim 2, wherein the lock lever has a protrusion configured to engage with the arm, and wherein the protrusion protrudes from the drum frame in an axial direction of the developing roller and is arranged between the arm and the opening.

4. The image forming apparatus according to claim 2 further comprising:

a slide guide configured to guide sliding of the arm; and a link configured to couple the arm to the cover, wherein the link is rotatably coupled to the arm and the cover.

5. The image forming apparatus according to claim 1, wherein the developing cartridge has a convex portion protruding toward the opening in a state where the developing cartridge is mounted to the drum frame of the drum cartridge mounted to the inside of the housing, and wherein the lock lever has a concave portion configured to engage with the convex portion.

6. The image forming apparatus according to claim 1, wherein the developing frame has a press receiving part that is to be pressed by the pressing member, and wherein the pressing member has a pressing surface, which presses the press receiving part when the pressing member is located at a pressing position at which the developing cartridge is mounted to the drum frame, and a support surface that, when the developing cartridge is lifted from the drum frame, supports the press receiving part and keeps the lifted developing cartridge at a non-pressing position.

7. The image forming apparatus according to claim 6 further comprising:

a contact protrusion coupled to the cover, the contact protrusion configured to contact the developing cartridge when the cover moves from the opened position to the closed position, and configured to move the developing cartridge from the non-pressing position to the pressing position.

8. The image forming apparatus according to claim 1, wherein the drum cartridge includes an urging member configured to urge the lock lever from the non-locked position toward the locked position.

9. An image forming apparatus comprising:

a housing having an opening;

a cover configured to cover the opening and being movable between a closed position at which the cover covers the opening and an opened position at which the opening is opened;

a developing cartridge including a developing roller and a developing frame having a toner accommodation chamber configured to accommodate therein toner;

a drum cartridge including a drum frame, to which the developing cartridge is detachably mountable, a photosensitive drum, a pressing member configured to press the developing roller to the photosensitive drum in a state where the developing cartridge is mounted to the drum frame, and a lock lever configured to lock the developing cartridge to the drum frame and releasing the lock based on a manual operation, the drum cartridge being mountable to an inside of the housing in a state where the developing cartridge is mounted to the drum cartridge;

an arm arranged to be engageable with the lock lever;

a slide guide configured to guide sliding of the arm; and a link configured to couple the arm to the cover, wherein the link is rotatably coupled to the arm and the cover, wherein in a state where the cover moves from the closed position to the opened position, the lock lever moves from a locked position at which the developing cartridge is prevented from being demounted from the drum frame to a non-locked position at which the developing cartridge is allowed to be demountable from the drum frame, wherein the cover opens the opening by swinging about a first swinging axis, and wherein the arm is coupled to the cover and moves the lock lever from the locked position to the non-locked position in a state where the cover moves from the closed position to the opened position.

10. The image forming apparatus according to claim 9, wherein the lock lever is swingable about a second swinging axis between the locked position and the non-locked position, and lifts the developing cartridge from the drum frame when the lock lever swingably moves from the locked position to the non-locked position.

11. The image forming apparatus according to claim 9, wherein the lock lever has a protrusion configured to engage with the arm, and wherein the protrusion protrudes from the drum frame in an axial direction of the developing roller and is arranged between the arm and the opening.

* * * * *